United States Patent [19]

Aeschlimann

[11] 4,447,359
[45] May 8, 1984

[54] SUBSTITUTED 2-(CHLORO, BROMO OR CYANO)-4,6-DINITROPHENYL AZO PHENYL DYES

[75] Inventor: Peter Aeschlimann, Allschwil, Switzerland

[73] Assignee: Ciba-Geigy Corporation, Ardsley, N.Y.

[21] Appl. No.: 130,795

[22] Filed: Mar. 17, 1980

Related U.S. Application Data

[63] Continuation of Ser. No. 960,698, Nov. 14, 1978, abandoned.

[30] Foreign Application Priority Data

Nov. 21, 1977 [LU] Luxembourg .................. 78553

[51] Int. Cl.³ ............. C09B 29/085; D06P 1/18; D06P 3/26; D06P 3/54
[52] U.S. Cl. ......................... 260/207; 564/202
[58] Field of Search .................. 260/207, 207.1

[56] References Cited

U.S. PATENT DOCUMENTS

| | | | |
|---|---|---|---|
| 2,522,234 | 7/1960 | Groebke | 260/207 |
| 3,250,763 | 5/1966 | Gies et al. | 260/207 |
| 3,562,789 | 2/1971 | Sasa et al. | 260/207 |
| 4,076,706 | 2/1978 | Clark | 260/207 |
| 4,111,930 | 9/1978 | Meybeck | 260/207.1 |

FOREIGN PATENT DOCUMENTS

| | | | |
|---|---|---|---|
| 2600064 | 7/1976 | Fed. Rep. of Germany | 260/158 |
| 2654889 | 6/1977 | Fed. Rep. of Germany | 260/207 |
| 1534269 | 6/1968 | France | 260/207 |
| 47-50356 | 12/1972 | Japan | 260/207 |
| 1319087 | 5/1973 | United Kingdom | 260/207 |
| 1324303 | 7/1973 | United Kingdom | 260/207 |
| 1352059 | 5/1974 | United Kingdom | 260/207 |
| 1498000 | 1/1978 | United Kingdom | 260/207 |

OTHER PUBLICATIONS

Maeda et al., Chemical Abstracts, vol. 81, 122767y, (1974).

Primary Examiner—Floyd D. Higel
Attorney, Agent, or Firm—Edward McC. Roberts

[57] ABSTRACT

There are described new blue to navy blue monoazo dyes of the general formula I

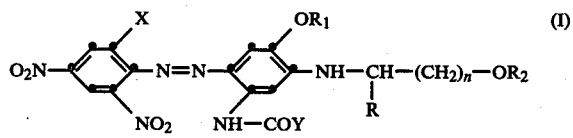

in which X is chlorine, bromine or cyano, R is an unsubstituted or substituted alkyl group having 1 to 4 carbon atoms, $R_1$ and $R_2$ independently of one another are each an alkyl group which has 1 to 4 carbon atoms and which is unsubstituted or substituted by lower alkoxy, aryloxy or aryl, or an unsubstituted or substituted phenyl group, Y is lower alkyl or lower alkoxy, and n is an integer of at most 4; processes for producing them; and their use for dyeing and printing hydrophobic materials, especially aromatic polyesters, the resulting dyeings being level deep and reproducible, while additionally distinguished by good general fastness properties.

11 Claims, No Drawings

SUBSTITUTED 2-(CHLORO, BROMO OR CYANO)-4,6-DINITROPHENYL AZO PHENYL DYES

This is a continuation of application Ser. No. 960,698, filed on Nov. 14, 1978, and now abandoned.

The invention relates to valuable new blue to navy blue monoazo dyes of the general formula I

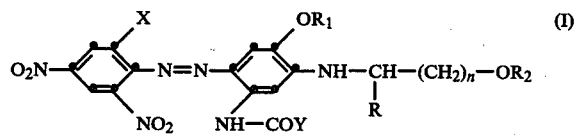

in which X is chlorine, bromine or cyano, R is an unsubstituted or substituted alkyl group having 1 to 4 carbon atoms, $R_1$ and $R_2$ independently of one another are each an alkyl group which has 1 to 4 carbon atoms and which is unsubstituted or substituted by lower alkoxy, aryloxy or aryl, or an unsubstituted or substituted phenyl group, Y is lower alkyl or lower alkoxy, and n is an integer of at most 4; and also to the production and use of the new dyes.

The terms 'lower alkyl and lower alkoxy' relate to alkyl or alkoxy groups having 1 to 4, preferably 1 or 2, carbon atoms, such as methyl, ethyl, methoxy or ethoxy.

R, $R_1$ and $R_2$ as an alkyl group having 1 to 4 carbon atoms can be both straight-chain and branched-chain. They are, independently of one another, for example methyl, ethyl, propyl, isopropyl, butyl, isobutyl, sec-butyl or tert-butyl. These alkyl groups can be substituted, for example in the case of R by halogen, such as bromine or particularly chlorine, CN, lower alkoxy, especially methoxy or ethoxy, or aryloxy, particularly phenoxy; or in the case of $R_1$ and $R_2$ by lower alkoxy, especially methoxy and ethoxy, aryloxy, particularly phenoxy, or aryl, especially phenyl. For R there may be mentioned in particular methyl, ethyl, methoxymethyl and phenoxymethyl; and for $R_1$ and $R_2$ in particular methyl, ethyl, propyl, isopropyl, methoxyethyl, phenoxyethyl, benzyl and phenethyl. As a substituted phenyl group, $R_1$ and $R_2$ can be for example tolyl or chlorophenyl.

X is preferably chlorine or bromine. R is preferably unsubstituted alkyl, especially ethyl and in particular methyl. $R_1$ is preferably isopropyl, ethyl or methoxyethyl and especially methyl. $R_2$ is preferably lower alkyl or lower alkoxyalkyl, particularly methyl, ethyl, methoxyethyl or ethoxyethyl. Y is preferably methyl or ethyl. n is preferaly 1 or 2, especially 1. In preferred monoazo dyes of the formula I, X is chlorine or bromine, R, $R_1$ and Y independently of one another are methyl or ethyl, $R_2$ is as defined under the formula I, and n is 1 or 2.

Preferred monoazo dyes of the formula I are in particular those in which X is chlorine or bromine, R, $R_1$ and Y independently of one another are methyl or ethyl, $R_2$ is methyl, ethyl, methoxyethyl or ethoxyethyl, and n is 1.

Dyes of the formula (I) are obtained by a process wherein diazo components of amines of the general formula II

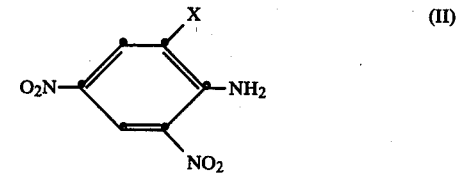

are coupled with coupling components of the general formula III, in the p-position with respect to the amino group:

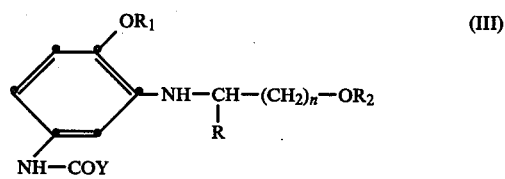

in which X, R, $R_1$, $R_2$, Y and n are as defined under the formula I.

The diazo components of the formula II are known, and can be obtained by processes known per se. The coupling components of the formula III are new, and can be obtained for example by condensation of a ketone of the formula

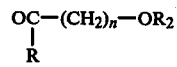

with an amine of the formula

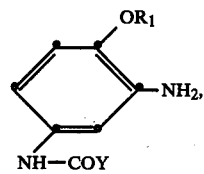

in which R, $R_1$, $R_2$, Y and n are as defined under the formula I, with subsequent reduction of the condensation product.

the diazotisation of the diazo components mentioned is performed in the customary manner, preferably with the aid of a solution of nitrosylsulfuric acid in concentrated sulfuric acid.

The coupling can likewise be performed in a manner known per se, for example in a neutral or advantageously acid aqueous solution or suspension.

After coupling has been effected, the formed dyes can be readily separated from the coupling mixture, for example by filtration, since they are virtually insoluble in water.

According to the invention, there is suggested in addition an alternative process for producing the dyes of the invention, which process comprises treating the corresponding dye of the formula I, in which —COY denotes a hydrogen atom, with an acylating agent. Examples of acylating agents are acetic anhydride, acetyl chloride or propionyl chloride. This alternative process is advantageously performed by reacting the reactants in the presence of a base, for example pyridine.

The new monoazo dyes are excellently suitable for dyeing and printing hydrophobic materials, for example those made from polyamides, in particular however textiles or fibres made from aromatic polyesters, such as polyethylene glycol terephthalate, or condensation products from terephthalic acid and 1,4-(bis-hydroxymethyl)-cyclohexane or cellulose triacetate. The monoazo dyes according to the invention have in particular very good dyeing and build-up properties on aromatic polyester textile materials, in consequence which it is possible to obtain with uniformly defined monoazo dyes level, deep and reproducible shades.

The blue to navy blue dyeings and printings obtained on the stated materials with the said dyes are distinguished by a good colour in artificial light and good colouring strength, and by good general fastness properties, especially good pH stability, and good fastness to sublimation and to light.

Dyeing with the dyes of the formula I is performed by introducing the material to be dyed into an aqueous dispersion of the dyes, preferably at elevated temperatures, for example at 40° C.; optionally adding customary auxiliaries, such as sulfite cellulose degradation products, condensation products from higher alcohols with ethylene oxide, polyglycol ethers of fatty acid amides or alkylphenols, and so forth, and then preferably adding to the bath acid agents, for example organic acids such as formic acid or acetic acid, or inorganic acids such as phosphoric acid. The bath is subsequently heated to the optimum dyeing temperature, preferably, depending on the type of fibre materials to be dyed, to a temperature of between 70° and 140° C. Dyeing is performed at this temperature until the desired depth of colour is obtained. After cooling of the bath, the dyed fibre material can be subjected to an aftertreatment, for example in the case of acetate fibres to an aftertreatment with soaps, or in the case of fibres formed from aromatic polyesters to a reductive aftertreatment with the addition of alkali.

When aromatic polyesters or triacetate fibres are dyed at a temperature of 105° C., it is generally advantageous to concomitantly use customary carrier substances, such as mono-, di- or trichlorobenzene, benzoic acid, salicylic acid, o- and p-phenylphenol or benzyl alcohol.

Printing is likewise carried out in a manner known per se by applying to the materials a printing paste containing the dye(s) and the customary auxiliaries, and subsequently subjecting the printings to a heat treatment.

The claimed dyes are superior to the nearest comparable dyes by a better fastness to boiling and better substantivity in the dyeing of polyester materials.

The invention is further illustrated by the following Examples. Except where otherwise stated in the Examples, the term 'parts' denotes parts by weight, percentages are given as percent by weight, and the temperatures in degrees Centigrade.

EXAMPLE 1

21.8 parts of 6-chloro-2,4-dinitroaniline are suspended in 110 parts of 88% sulfuric acid, and the suspension is diazotised at 20° by the dropwise addition of 32 parts of nitrosylsulfuric acid (40%) within 30 minutes, and stirring for 2 hours. The resulting diazo solution is cooled, and is added dropwise in the course of 30 minutes to a solution of 20 parts of the coupling component of the formula

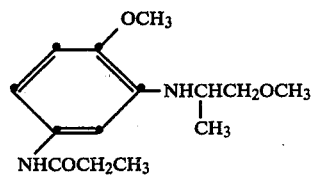

in 300 ml of water and 12 parts of concentrated hydrochloric acid.

The coupling is instantaneously completed, The dye which has precipitated is filtered off, washed with water at 100° until neutral and dried. The resulting dye, finely dispersed with dinaphthylmethanedisulfonic acid, exhibits on polyethylene glycol terephthalate fibres very good build-up and levelling properties, and dyes these fibres in navy blue shades. The dyeings have very good fastness to light.

The coupling component mentioned is produced by hydrogenation of the Schiff base, which has been obtained by condensation of 4-propionylamino-2-aminoanisole with 1-methoxypropanone-2 according to the following reaction pattern

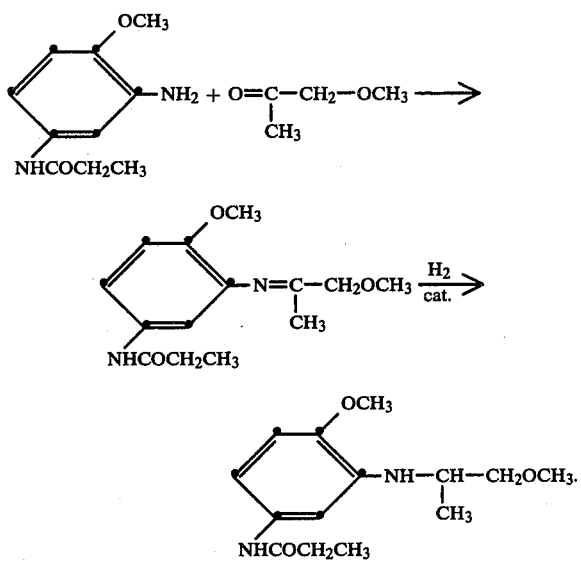

In an analogous manner are obtained, from the corresponding diazo and coupling components, the dyes listed in the following Table, which dyes dye polyethylene glycol terephthalate fibres likewise in navy blue shades:

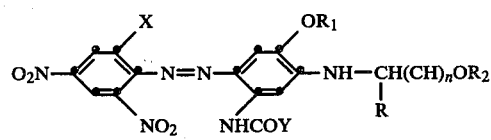

TABLE

| No. | X  | R    | $R_1$ | $R_2$ | Y          | n |
|-----|----|------|-------|-------|------------|---|
| 2   | Cl | —CH₃ | CH₃   | CH₃   | CH₃        | 1 |
| 3   | Br | "    | "     | "     | —CH₂CH₃    | 1 |

TABLE-continued

| No. | X | R | $R_1$ | $R_2$ | Y | n |
|---|---|---|---|---|---|---|
| 4 | " | " | " | | —$CH_3$ | 1 |
| 5 | " | " | " | —$CH_2CH_3$ | " | 1 |
| 6 | " | " | " | " | —$CH_2CH_3$ | 1 |
| 7 | Cl | " | " | " | " | 1 |
| 8 | " | " | " | " | —$CH_3$ | 1 |
| 9 | " | " | " | $CH_2CH_2OCH_3$ | " | 1 |
| 10 | " | " | " | " | —$CH_2CH_3$ | 1 |
| 11 | Br | " | " | " | " | 1 |
| 12 | " | " | " | " | $CH_3$ | 1 |
| 13 | " | " | " | —$CH_2CH_2O$—$C_6H_5$ | " | 1 |
| 14 | Br | " | —$CH_3$ | " | —$CH_2CH_3$ | 1 |
| 15 | Cl | " | " | " | " | 1 |
| 16 | " | " | " | " | $CH_3$ | 1 |
| 17 | Br | —$CH_2OCH_3$ | " | —$CH_3$ | " | 1 |
| 18 | Cl | " | " | " | " | 1 |
| 19 | Br | " | " | $CH_3$ | —$CH_2CH_3$ | 1 |
| 20 | " | $CH_3$ | " | $C_6H_5$ | —$CH_3$ | 1 |
| 21 | " | " | " | " | —$CH_2CH_3$ | 1 |
| 22 | " | —$CH_2CH_3$ | " | " | " | 1 |
| 23 | Cl | " | " | " | " | 1 |
| 24 | " | —$CH_3$ | " | " | " | 1 |
| 25 | " | " | " | " | —$CH_3$ | 1 |
| 26 | " | " | " | —$CH_2$—$C_6H_5$ | " | 1 |
| 27 | " | " | " | " | —$CH_2CH_3$ | 1 |
| 28 | Br | " | " | " | " | 1 |
| 29 | " | " | " | " | —$CH_3$ | 1 |
| 30 | Cl | —$CH_3$ | —$CH(CH_3)_2$ | —$CH_3$ | " | 1 |
| 31 | Br | —$CH_2O$—$C_6H_5$ | " | " | " | 1 |
| 32 | Br | —$CH_2O$—$C_6H_5$ | —$CH(CH_3)_2$ | —$CH_2CH_2OCH_3$ | —$CH_3$ | 1 |
| 33 | Cl | " | " | —$CH_2CH_3$ | " | 1 |
| 34 | " | —$CH_3$ | —$CH_2CH_2OCH_3$ | —$CH_3$ | —$CH_3$ | 1 |
| 35 | Br | " | " | " | " | 1 |
| 36 | " | " | " | " | —$CH_2CH_3$ | 1 |
| 37 | " | " | " | —$CH_2CH_2OCH_3$ | " | 1 |
| 38 | " | " | " | " | —$CH_3$ | 1 |
| 39 | Cl | " | " | " | " | 1 |
| 40 | " | " | " | " | —$CH_2CH_3$ | 1 |
| 41 | " | " | " | —$CH_2CH_2OC_6H_5$ | " | 1 |
| 42 | " | " | " | " | —$CH_3$ | 1 |
| 43 | Br | " | " | " | " | 1 |
| 44 | " | —$CH_2OCH_3$ | " | $CH_3$ | " | 1 |
| 45 | Cl | " | " | —$CH_3$ | —$CH_2CH_3$ | 1 |
| 46 | " | " | " | —$CH_2CH_3$ | —$CH_3$ | 1 |
| 47 | " | —$CH_3$ | —$CH_2CH_3$ | —$CH_3$ | " | 1 |
| 48 | Br | " | " | —$CH_2CH_2OCH_3$ | " | 1 |
| 49 | " | " | " | " | —$CH_2CH_3$ | 1 |
| 50 | Cl | " | " | " | " | 1 |
| 51 | CN | " | $CH_3$ | " | " | 1 |
| 52 | " | " | " | —$CH_3$ | " | 1 |
| 53 | " | " | " | —$C_6H_5$ | " | 1 |
| 54 | " | " | " | —$CH_2CH_2OC_6H_5$ | —$CH_3$ | 1 |
| 55 | " | " | —$CH(CH_3)_2$ | " | " | 1 |
| 56 | Cl | —$CH_2CH_3$ | —$CH_3$ | —$CH_3$ | " | 1 |
| 57 | " | " | " | $CH_2CH_3$ | " | 1 |
| 58 | " | " | " | —$C_6H_5$ | " | 2 |
| 59 | Br | " | " | " | —$CH_2CH_3$ | 2 |
| 60 | " | —$CH_3$ | " | $CH_3$ | " | 4 |
| 61 | Br | " | " | " | —$CH_3$ | 2 |
| 62 | " | " | —$CH_2CH_3$ | " | " | 2 |
| 63 | Br | —$CH_3$ | —$CH_3$ | $CH_3$ | —$CH_3$ | 3 |
| 64 | Cl | " | " | " | " | 3 |
| 65 | " | " | " | —$CH_2CH_2CH_3$ | " | 3 |
| 66 | " | " | —$CH(CH_3)_2$ | —$C_6H_5$ | " | 2 |
| 67 | " | " | $CH_3$ | —$CH_3$ | —$OCH_3$ | 1 |
| 68 | Br | " | —$C_6H_5$ | " | $CH_3$ | 1 |
| 69 | " | " | —$C_6H_4$—$CH_3(4)$ | " | " | 1 |
| 70 | " | " | —$CH_3$ | —$C_6H_4$—p-ter.$C_4H_9$ | " | 1 |
| 71 | " | " | " | —$C_6H_4$—(3)Cl | " | 1 |
| 72 | " | " | " | —$C_6H_3$—(2,4) di $CH_3$ | " | 1 |

DYEING INSTRUCTIONS 1 part of the dye obtained according to Example 1 is ground wet with 2 parts of a 50% aqueous solution of the sodium salt of dinaphthylmethanedisulfonic acid and dried.

This dye preparation is stirred up with 40 parts of a 10% aqueous solution of the sodium salt of N-butyl-$\mu$-heptadecylbenzimidazoledisulfonic acid and 4 parts of a 40% acetic acid solution. A dye bath of 4000 parts is prepared by diluting this preparation with water.

100 parts of a cleansed polyester fibre material are introduced into this bath at 50°; the temperature is then raised within half an hour to 120° to 130°, and dyeing is performed at this temperature in the closed vessel for one hour. The material is subsequently rinsed. A level, full, navy blue dyeing having excellent fastness to light and good fastness to sublimation is obtained.

PRINTING INSTRUCTIONS 25 parts of the dye according to Example 1, which has previously been finely ground, 550 parts of an 8% aqueous thickening from modified locust bean flour, 50 parts of a 10% solution of the sodium salt of m-nitrobenzenesulfonic acid and 10 parts of a mixture of potassium oleate and pine oil are mixed together, and the mixture is made up with water to 1000 parts.

The mixture is stirred by means of a high-speed stirrer until the dye is completely dispersed, and polyethylene glycol terephthalate fabric is subsequently printed with this paste. After printing, the fabric is dried, and steamed for 20 minutes at 1½ atms. (excess pressure); it is then rinsed for 10 minutes with cold water, soaped twice in the hot state with the addition of a small amount of hydrosulfite, subsequently rinsed cold and finally dried. A fast navy blue printing is obtained.

I claim:
1. A monoazo dye of the formula

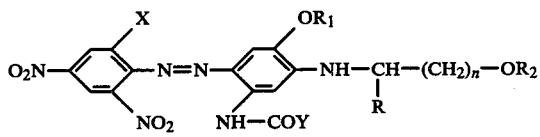

in which
X is chloro, bromo or cyano;
R is alkyl of 1 to 4 carbon atoms which is unsubstituted or substituted by bromo, chloro, cyano, lower alkoxy or phenoxy;
$R_1$ and $R_2$ are independently alkyl of 1 to 4 carbon atoms which is unsubstituted or substituted by lower alkoxy, phenoxy or phenyl, or is phenyl, tolyl, chlorophenyl, tert-butylphenyl or dimethylphenyl;
Y is lower alkyl or lower alkoxy; and
n is an integer of at most 4.

2. A monoazo dye according to claim 1, wherein X is chlorine or bromine.

3. A monoazo dye according to claim 1, wherein R, $R_1$ and Y independently of one another are each methyl or ethyl, and n is 1 or 2.

4. A monoazo dye according to claim 3, wherein $R_2$ is methyl, ethyl, methoxyethyl or ethoxyethyl.

5. A monoazo dye according to claim 1, wherein X is chlorine or bromine, R, $R_1$ and Y are each methyl or ethyl, $R_2$ is methyl, ethyl, methoxymethyl or ethoxyethyl, and n is 1.

6. The dye of the formula

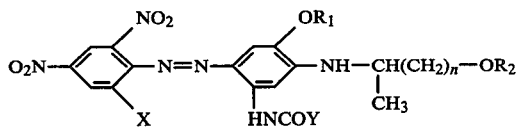

wherein
X is chlorine, bromine or cyano;
$R_1$ and Y are straight or branched alkyl of 1–4 carbons;
$R_2$ is 1–4 C alkyl which may be substituted with 1–4 C alkoxy or aryloxy, phenyl or substituted phenyl; and
n is an integer 1–4.

7. The dye according to claim 6, wherein X is Br, Cl or CN; $R_1$ and Y are methyl; $R_2$ is selected from 1–4 C alkyl and phenyl; and n is 1.

8. The dye according to claim 6 of the formula

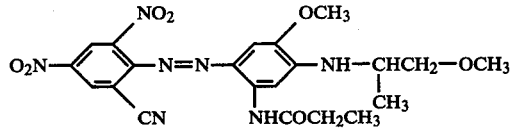

9. The dye according to claim 6 of the formula

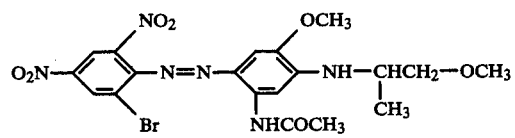

10. The dye according to claim 6 of the formula

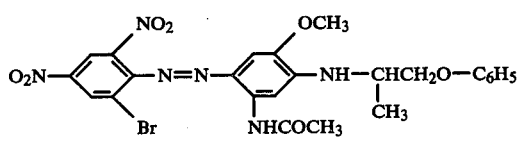

11. The dye according to claim 6 of the formula

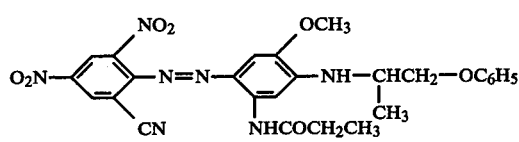

* * * * *